United States Patent
Peng et al.

(10) Patent No.: US 9,798,139 B2
(45) Date of Patent: Oct. 24, 2017

(54) WEARABLE ELECTRONIC DEVICE AND DISPLAY METHOD

(71) Applicants: Beijing Lenovo Software Ltd., Haidian District, Beijing (CN); Lenovo (Beijing) Co., Ltd., Haidian District, Beijing (CN)

(72) Inventors: Shifeng Peng, Beijing (CN); Xinru Hou, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 32 days.

(21) Appl. No.: 14/164,470

(22) Filed: Jan. 27, 2014

(65) Prior Publication Data

US 2014/0210852 A1 Jul. 31, 2014

(30) Foreign Application Priority Data

Jan. 28, 2013 (CN) .......................... 2013 1 0032506

(51) Int. Cl.
G09G 5/00 (2006.01)
G02B 27/00 (2006.01)
(Continued)

(52) U.S. Cl.
CPC .......... *G02B 27/0093* (2013.01); *G01W 1/02* (2013.01); *G02B 27/017* (2013.01); *G06F 1/163* (2013.01);
(Continued)

(58) Field of Classification Search
CPC combination set(s) only.
See application file for complete search history.

(56) References Cited

U.S. PATENT DOCUMENTS 5,966,680 A * 10/1999 Butnaru .................. 702/150
6,005,548 A * 12/1999 Latypov et al. ......... 345/156
(Continued)

FOREIGN PATENT DOCUMENTS

| CN | 1750570 | 3/2006 |
|----|---------|--------|
| CN | 101141567 | 3/2008 |
| CN | 101692194 | 4/2010 |

OTHER PUBLICATIONS

First Office Action dated Jun. 29, 2016 out of Chinese priority Application No. 201310032506.6 (21 pages including English translation).

(Continued)

*Primary Examiner* — M Good Johnson
(74) *Attorney, Agent, or Firm* — Brinks Gilson & Lione; G. Peter Nichols (57) ABSTRACT

A wearable electronic device and a display method are described. The wearable electronic device includes a fix unit, by which the wearable electronic device can maintain a position relationship with respect to a first part of a user body; a detection unit, configured to detect a posture of the first part of the user body, and to acquire a detection result; a posture determination unit, configured to determine whether the detection result meets a predetermined acquisition condition; a first acquisition unit, configured to acquire weather information when the posture determination unit determines that the detection result meets a predetermined acquisition condition; an image generation unit, configured to generate a weather image corresponding to the weather information; and a display unit, configured to display the weather information and/or the weather image.

9 Claims, 4 Drawing Sheets

(51) Int. Cl.
  *G02B 27/01* (2006.01)
  *G06F 1/16* (2006.01)
  *G01W 1/02* (2006.01)

(52) U.S. Cl.
  CPC ............... *G02B 2027/0141* (2013.01); *G06F 2200/1637* (2013.01)

(56) References Cited

U.S. PATENT DOCUMENTS

| | | | |
|---|---|---|---|
| 6,509,529 B2 * | 1/2003 | Kamath et al. | 174/255 |
| 8,223,088 B1 * | 7/2012 | Gomez | G06F 3/03547 345/7 |
| 8,245,155 B2 | 8/2012 | Nakajima | |
| 8,830,142 B1 * | 9/2014 | Kim et al. | 345/8 |
| 9,589,000 B2 * | 3/2017 | Fateh | G06F 17/30312 |
| 2005/0174302 A1 | 8/2005 | Ishii | |
| 2009/0002332 A1 * | 1/2009 | Park | G06F 3/04817 345/173 |
| 2009/0144661 A1 | 6/2009 | Nakajima | |
| 2009/0313587 A1 | 12/2009 | Goodwin | |
| 2010/0333045 A1 | 12/2010 | Guéziec | |
| 2012/0200478 A1 | 8/2012 | Kobayashi | |
| 2012/0242560 A1 * | 9/2012 | Nakada | G09G 3/3406 345/8 |
| 2013/0050258 A1 * | 2/2013 | Liu | G06F 3/005 345/633 |
| 2013/0083011 A1 * | 4/2013 | Geisner | G09G 5/00 345/419 |
| 2013/0187835 A1 * | 7/2013 | Vaught et al. | 345/8 |
| 2014/0098128 A1 * | 4/2014 | Fein | G06F 3/011 345/633 |
| 2014/0098134 A1 * | 4/2014 | Fein | G06T 11/60 345/633 |
| 2014/0111838 A1 * | 4/2014 | Han et al. | 359/13 |
| 2014/0253588 A1 * | 9/2014 | Mandala | 345/633 |
| 2014/0282047 A1 * | 9/2014 | Lee | G06F 3/0488 715/741 |

OTHER PUBLICATIONS

Second Office Action dated Mar. 22, 2017 (18 pages including English translation) out of Chinese priority Application No. 201310032506.6.

* cited by examiner

WEARABLE ELECTRONIC DEVICE AND DISPLAY METHOD

BACKGROUND

This application claims priority to Chinese Patent Application No. 201310032506.6 filed on Jan. 28, 2013, the entire contents of which are incorporated herein by reference.

The embodiments of the invention relate to a wearable electronic device and an input method applied on the wearable electronic device.

With the development of communication technologies, portable electronic devices with data transfer functions, such as portable computers, tablet computers, smart phones, and multimedia players, are widely used. Users may use these electronic devices to explore web pages or mails and to search information through wireless transmission devices or wired transmission devices such as wireless network, Bluetooth, infrared, and the like. For example, when the user wishes to acquire weather information, it is possible to connect to Internet through wireless transmission devices or wired transmission devices, and search for related information.

However, in the known electronic devices with data transfer functions, when the user needs to inquire weather information, he/she has to choose and start a weather inquire application in the electronic device, or to explore relevant pages with an explorer in the electronic device, operations of which are complicated.

SUMMARY

Embodiments of the invention are aimed to provide a wearable electronic device and a display method applied on the wearable electronic device, so as to resolve the above-mentioned problems.

One embodiment of the invention provides a wearable electronic device, including: a fix unit, by which the wearable electronic device is able to maintain a position relationship with respect to a first part of a user body; a detection unit, configured to detect a posture of the first part of the user body, and to acquire a detection result; a posture determination unit, configured to determine whether the detection result matches a predetermined acquisition condition; a first acquisition unit, configured to acquire weather information when the posture determination unit determines that the detection result matches a predetermined acquisition condition; an image generation unit, configured to generate a weather image corresponding to the weather information; and a display unit, configured to display the weather information and/or the weather image.

Another embodiment of the invention provides a display method, applied on a wearable electronic device, the wearable electronic device includes a fix unit, by which the wearable electronic device is able to maintain a position relationship with respect to a first part of a user body. The method includes: detecting of a posture of the first part of the user body, and acquiring of a detection result; determining of whether the detection result matches a predetermined acquisition condition; acquiring of weather information when the posture determination unit determines that the detection result matches a predetermined acquisition condition; generating of a weather image corresponding to the weather information; and displaying of the weather information and/or the weather image.

In the wearable electronic device according to the embodiments of the invention, it is possible to maintain the position relationship with respect to the first part of the user body, and in the wearable electronic device according to the embodiments of the invention and the display method applied on the wearable electronic device, it is possible to detect the posture of the first part of the user body, and when it is determined the posture of the first part of the user body meets a predetermined acquisition condition according to the detection result, weather information and/or the weather image is acquired and displayed, so as to simplify operations by which the user acquires weather information, and facilitate the user.

BRIEF DESCRIPTION OF THE DRAWINGS

In order to explain technical solutions of the embodiments of the invention clearly, figures needed to describe embodiments of the invention will be described briefly hereafter.

DETAILED DESCRIPTION

Hereafter, preferable embodiments of the invention will be described with reference to accompanying figures. It should be noted, in the specification and figures, like steps and elements are noted with like reference numerals, and repeated explanations of these steps and elements will be omitted.

Figure 1:
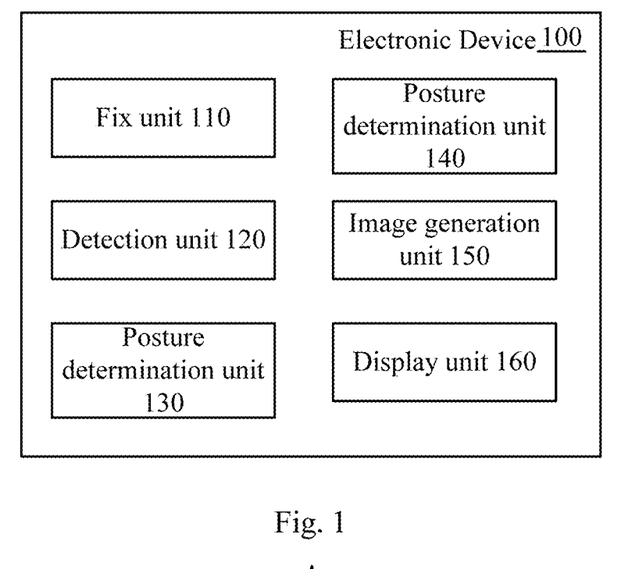
FIG. 1 shows an exemplary block diagram of a wearable electronic device according to one embodiment of the invention.

In the following embodiments of the invention, specific modes of the wearable electronic device includes but are not limited to mobile phones, Personal Digital Assistant, multimedia players, and the like. Hereafter, a wearable electronic device according to one embodiment of the invention will be explained with reference to FIG. 1. FIG. 1 shows an exemplary block diagram of a wearable electronic device 100 according to one embodiment of the invention. As shown in FIG. 1, the electronic device 100 includes a fix unit 110, a detection unit 120, a posture determination unit 130, a posture determination unit 140, an image generation unit 150 and a display unit 160.

Specifically, the wearable electronic device 100 can maintain a position relationship with respect to a first part of the user body by the fix unit 110. According to one example of the invention, the wearable electronic device 100 can be worn on a wrist of the user by the fix unit 110. For example, the fix unit 110 may be a ring component or a band component capable of being worn on the wrist of the user. Optionally, in this case, the fix unit 110 may be an elastic component or a component with adjustable length, so that the fix unit 110 can better fit the wrist of the user. Alternatively, according to another example of the invention, the wearable electronic device 100 can be worn on other parts of the user body such as user's head or the like with the fix unit 110.

The detection unit 120 can detect a posture of the first part of the user body of which the position with respect to the fix unit 110 is maintained by the fix unit 110, and acquire a detection result. Next, the posture determination unit 130 can determine whether the detection result acquired by the detection unit 120 meets a predetermined acquisition condition. For example, if the wearable electronic device 100 can be worn on the wrist of the user with the fix unit 110, it is possible to set the predetermined acquisition condition to be overturning the wrist. Moreover, the detection unit 120 may be set on the fix unit 110, so as to detect the posture of the user's wrist. As another example, in a case of the wearable electronic device 100 can be worn on the user's head by the fix unit 110, it is possible to set the predetermined acquisition condition to be looking up so as to fit the user's habits, since the user usually looks at the sky while observing weather condition. Moreover, the detection unit 120 may be set on the fix unit 110 for detecting the posture of the user's head.

When the posture determination unit determines that the detection result meets the predetermined acquisition condition, a first acquisition unit 140 may acquire weather information. For example, the first acquisition unit 140 may include wired or wireless network connection devices. When the posture determination unit determines that the detection result meets the predetermined acquisition condition, the first acquisition unit 140 may acquire weather information from a specific server (the access address of which has been stored in advance, for example) through the wired or wireless network connection devices. An image generation unit 150 may generate a weather image corresponding to the weather information. And a display unit 160 may display the weather information acquired by the first acquisition unit 140 or the weather image generated by the image generation unit 150.

Moreover, according to one example, the wearable electronic device 100 can include an environment determination unit. The environment determination unit can determine whether the wearable electronic device is being indoors or outdoors. As an example, the environment determination unit can include a light sensor module for detecting the intensity of the environment light, and the environment determination unit may determine whether the wearable electronic device is being indoors or outdoors based on the intensity of the environment light detected by the light sensor module. As another example, the environment determination unit may include a geo-location information acquisition module, such as a GPS module, for acquiring geo-location information, and the environment determination unit may determine whether the wearable electronic device is being indoors or outdoors based on the geo-location information acquired by the geo-location information acquisition module. When the environment determination unit determines that the wearable electronic device is currently being indoors, the image generation unit 150 may generate the first weather image corresponding to the weather information, and the display unit 160 may display the weather information and/or the first weather image. On the other hand, when the environment determination unit determines that the wearable electronic device is currently being outdoors, the image generation unit 150 may generate the second weather image corresponding to the weather information, and the display unit 160 may display the weather information and/or the second weather image.

Figure 2A:
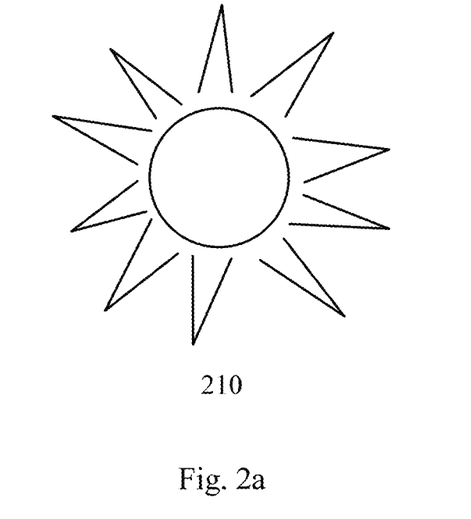
FIG. 2a is a diagram explaining an exemplary circumstance of a weather image corresponding to weather information generated by image generation unit.
Figure 2B:
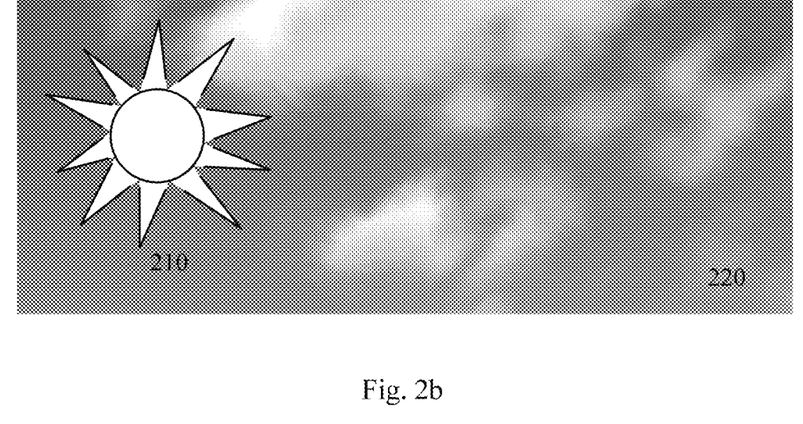
FIG. 2b is a diagram explaining another exemplary circumstance of a weather image corresponding to weather information generated by image generation unit.

According to one example of the invention, the second weather image corresponding to the weather information generated by the image generation unit 150 when the wearable electronic device is determined to be outdoors may be a part of the first weather image corresponding to the weather information generated by the image generation unit 150 when the wearable electronic device is determined to be indoors. For example, as shown in FIG. 2*a*, when the weather information acquired by the first acquisition unit 140 indicates the weather is sunny, if the environment determination unit determines the wearable electronic device to be outdoors, the image generation unit 150 may generate a sun icon 210 indicating sunny corresponding to the weather information as the second weather image. Moreover, as shown in FIG. 2*b*, when the weather information acquired by the first acquisition unit 140 indicates the weather is sunny, if the environment determination unit determines the wearable electronic device to be indoors, since user indoors cannot see the sky, the image generation unit 150 may generate a sun icon 210 indicating sunny corresponding to the weather information, as well as an image 220 about the clear sky, and then the sun icon 210 will be superimposed on the image 220 about the clear sky to form the first weather image. It should be noted, the invention is not limited herein. According to another example of the invention, when the weather information acquired by the first acquisition unit 140 indicates the weather is sunny, if the environment determination unit determines the wearable electronic device to be indoors, since the user cannot see the sky, the image generation unit 150 may generate a video clip to indicate weather condition so as to improve user experience.

Moreover, according to another example of the invention, the wearable electronic device 100 may also include a second acquisition unit. The second acquisition unit acquires time information. When the posture determination unit 130 determines the detection result meets the predetermined acquisition condition, the first acquisition unit 140 acquires weather information corresponding to the time information. According to one example of the invention, the second acquisition unit may include an input module. The user may input a specific time by the input module. For example, the user input module may include a touch screen. When the touch screen detects that the user is performing a sliding input on the screen, the second acquisition unit may acquire the time information according to the direction and distance of the sliding detected by the touch screen with reference to the current time. For example, a moment indicated by the sliding input by the user along a first direction on the touch screen can be set as a moment before current moment, and a moment indicated by the sliding input by the user along a second direction different from the first direction on the touch screen may be set as a moment after current moment. Every unit sliding distance (for example, 1 cm) corresponds to one hour. When the posture determination unit 130 determines the detection result meets the predetermined acquisition unit, while a user sliding along the second direction is detected on the touch screen and the sliding distance is 1 cm, the second acquisition unit may acquire the time information indicating a moment one hour after the current moment. The first acquisition unit 140 acquires the weather information corresponding to the moment one hour after the current moment, and the display unit 160 may display the weather information acquired by the first acquisition unit 140. Then, while the user continuously sliding along the second direction is detected on the touch screen and the sliding distance is 2 cm, the second acquisition unit may acquire the time information indicating the moment two hours after the current moment. The first acquisition unit 140 acquires the weather information corresponding to the moment two hour after the current moment, and the display unit 160 may display the weather information acquired by the first acquisition unit 140. Thus, the user may view the continuous change of the weather by continuously sliding on the touch screen.

Moreover, according to another example of the invention, the wearable electronic device 100 may also include a third acquisition unit. The third acquisition unit may acquire geo-location information. When the posture determination unit 130 determines the detection result meets the predetermined acquisition condition, the first acquisition unit acquires weather information corresponding to the geo-location. As described above, while the wearable electronic device 100 includes an environment determination unit with a GPS module, the environment determination unit may be used as the third acquisition unit to acquire the geo-location information by the GPS module.

The wearable electronic device according to the embodiments can maintains a position relationship with respect to a first part of the user body by the fix unit, and determine whether the posture of the first part of the user body meets the predetermined acquisition condition or not by detecting the posture of the first part of the user body and according to the detect result, and then if positive, acquires and displays the weather information and/or the weather image, so as to simply operations for user to acquire weather information, which conveniences user.

According to one example of the invention, the wearable electronic device 100 is a head-mounted electronic device. The wearable electronic device 100 can be maintained on the user's head. The detection unit 120 may detect the posture of user's head, and acquire a detection result. The posture determination unit 130 may determine whether the posture of the user's head is looking up based on the detection result. When the posture of the user's head is looking up, the detection result is determined to meet the predetermined acquisition condition.

Figure 3:
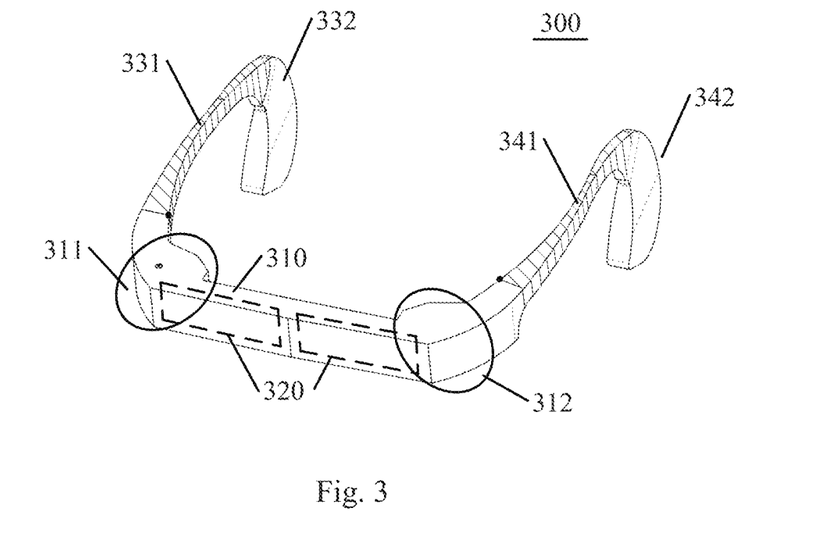
FIG. 3 is a diagram explaining an exemplary circumstance of a head-mounted electronic device shown in FIG. 1.

For example, the wearable electronic device is a glass-like electronic device. FIG. 3 is a diagram explaining an exemplary circumstance of the head-mounted electronic device shown in FIG. 1. The wearable electronic device 300 includes: a frame component 310, a lens component 320 connected to the frame component 310, a fix unit, a detection unit, a posture determination unit, a posture determination unit, an image generation unit and a display unit. The fix unit includes a first supporting arm, a second supporting arm, and a third holding portion.

As shown in FIG. 3, the first supporting arm 330 contains a first connection portion 331 (as shown in the shadow part of FIG. 3) and a first holding portion 332. The first connection portion 331 connects the frame component 310 and the first holding portion 332. The second supporting arm 340 contains a second connection portion 341 (as shown in the shadow part of FIG. 3) and a second holding portion 342. The second connection portion 341 connects the frame component 310 and the second holding portion 342. The third holding portion (not shown) is set on the frame component 310. Specifically, the third holding portion may be set on the position of the frame component 310 between two lens components. By the first holding portion, the second holding portion, and the third holding portion, the head-mounted electronic device is kept on the user's head. Specifically, the first holding portion and the second holding portion may be used to support the first supporting arm and the second supporting arm on ears of the user, while the third holding portion may be used to support the frame component 310 on bridge of the nose of the user.

The detection unit may be set on the frame component 310 or the fix unit. For example, the detection unit may be a gyro or the like, so as to detect the tilt angle of the wearable electronic device 300. Moreover, in this embodiment, the posture determination unit, the posture determination unit and the image generation unit are similar to the posture determination unit, the posture determination unit and the image generation unit in the above wearable electronic device 100, therefore the explanations will be omitted.

Moreover, the wearable electronic device 300 in the present embodiment may further include a first data transmission line and a display unit. The first data transmission line may be set in the fix unit and the frame component. The first data transmission line may transmit display signal to the display unit. The display unit may display to the user according to the display signal. Moreover, though a data transmission line is described as an example in this embodiment, the invention is not limited therein. For example, according to another example of the invention, it is also possible to transmit the display signal to the display unit via wireless transmission way.

Figure 4:
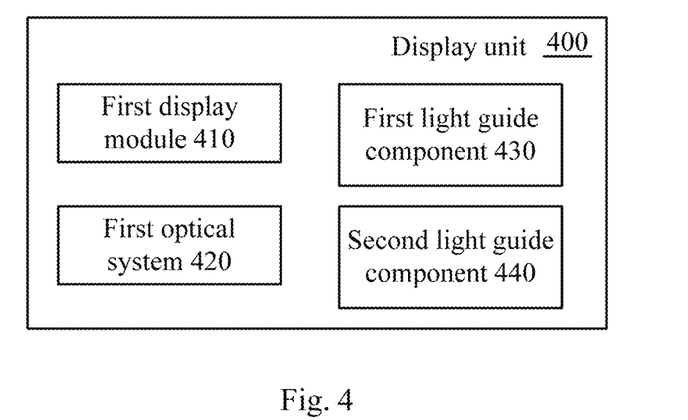
FIG. 4 is an exemplary block diagram of a display unit according to one embodiment of the invention.
Figure 5:
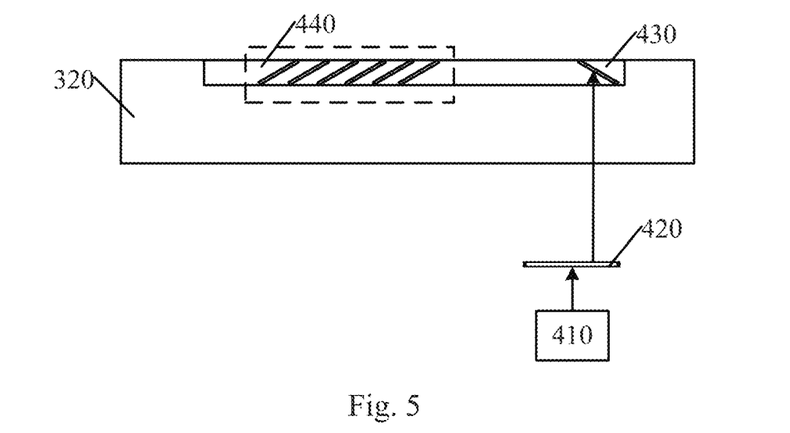
FIG. 5 is a diagram explaining an exemplary circumstance of the display unit shown in FIG. 4.

FIG. 4 is an exemplary block diagram of a display unit according to one embodiment of the invention. As shown in FIG. 4, a display unit 400 may include a first display module 410, a first optical system 420, a first light guide component 430, and a second light guide component 440. FIG. 5 is a diagram explaining an exemplary circumstance of the display unit 400 shown in FIG. 4.

The first display module 410 may be set in the glass frame 310, and is connected to the first data transmission line. The first display module 410 may display a first image according a first video signal transmitted by the first data transmission line. According one example of the invention, the first display module 410 may be a display module of a micro screen with a small size.

The first optical system 420 may also be set in the frame component 310. The first optical system 420 may receive light from the first display module, and perform a light path conversion on the light emitted from the first display module, so as to form a first enlarged virtual image. That is, the first optical system 420 has a positive refractive power. Therefore, the user may view the first image clearly, and the size of the image viewed by the user is not limited by the size of the display unit.

For example, the optical system may include a convex lens. Alternatively, in order to reduce aberration, eliminate dispersion and the like, which might interfere with imaging, and give user better visual experience, the optical system may also include a lens component formed by a plurality of lenses including convex lens and concave lens. Moreover, according to an example of the invention, the first display module 410 and the first optical system 420 may be correspondingly set along the axis of the optical system. Alternatively, according to another example of the invention, the display unit may further include a fifth light guide component, so as to transmit the light emitted from the first display module 410 to the first optical system 420.

As shown in FIG. 5, after the first optical system 420 has received the light emitted from the first display module 410 and performed the light path conversion on the light emitted from the first display module 410, the first light guide component 430 may transmit the light which has passed the first optical system to the second light guide component 440. The second light guide component 440 may be set in the lens component 320. And the second light guide component may receive light transmitted by the first light guide component 430, and reflect the light transmitted by the first light guide component 430 to eyes of the user wearing the head-mounted electronic device.

Back to FIG. 3, optionally, the lens component 320 satisfies a first predetermined transmittance in a direction from the inside to outside, so that the user can see the surrounding environment whiling watching the first enlarged virtual image. On the other hand, the lens satisfies a second predetermined transmittance in a direction from the outside to inside, so that a part of the light is refracted or reflected when the intensity of the light in the surrounding environment is strong.

Moreover, as shown in FIG. 3, according to one example of the invention, the frame component 310 may include a first pile head portion 311 connected to the first supporting arm and a second pile head portion 312 connected to the second supporting arm (the parts in the frame component indicated by circles as shown in FIG. 3). The first display module and the first optical system of the display unit are set in the pile head portions of the frame component 310.

Figure 6:
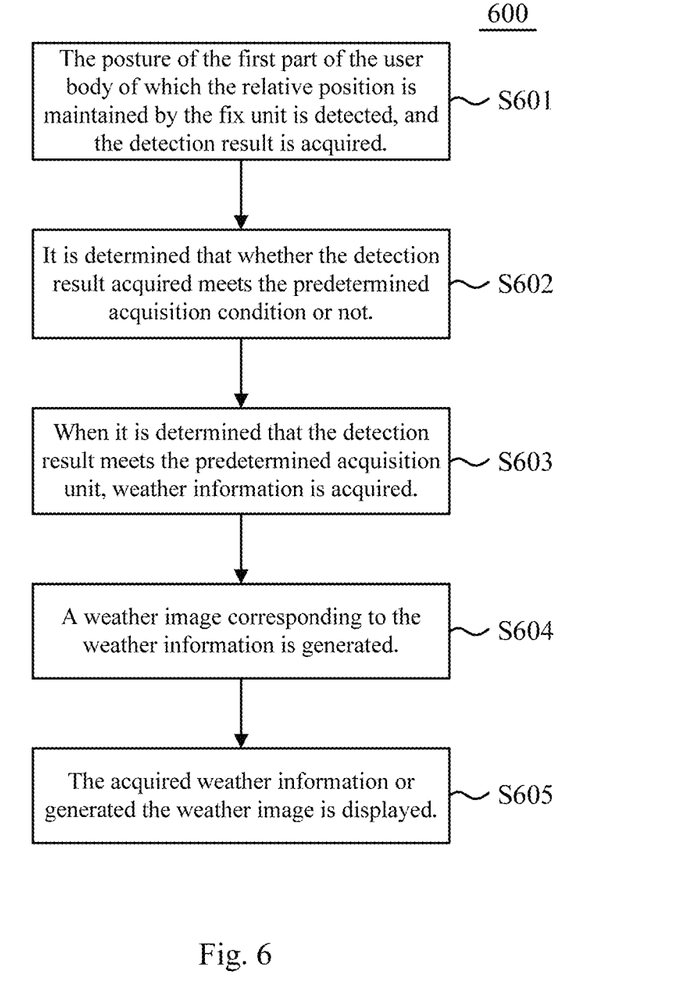
FIG. 6 is a flow chart describing the display method according to the embodiment of the invention.

Hereafter, an input method according to the embodiment of the invention will be illustrated with reference to FIG. 6. FIG. 6 is a flow chart describing the display method 600 according to the embodiment of the invention. The display method 600 may be used for the wearable electronic device including a fix unit. The wearable electronic device can maintain a position relationship with respect to a first part of the user body by the fix unit.

According to one example of the invention, the wearable electronic device can be worn on a wrist of the user by the fix unit. For example, the fix unit may be a ring component or a band component capable of being worn on the wrist of the user. Optionally, in this case, the fix unit may be an elastic component or a component with adjustable length, so that the fix unit can better fit the wrist of the user. Alternatively, according to another example of the invention, the wearable electronic device can be worn on other parts (for example, the head) of the user by the fix unit 110.

Various steps in the display method 600 may be executed by corresponding modules in the electronic device of FIG. 1 described above. Therefore, for sake of brevity, the detailed description will be omitted. For example, as shown in FIG. 6, in Step S601 of FIG. 6, the posture of the first part of the user body of which the relative position is maintained by the fix unit is detected, and the detection result is acquired. Next, in Step S602, it is determined that whether the detection result acquired meets the predetermined acquisition condition or not.

For example, in the case that the wearable electronic device can be worn on the wrist of the user by the fix unit, it is possible to set the predetermined acquisition condition to be overturning the wrist. In Step S602, it is possible to detect the posture of the user's wrist. As another example, in the case that the wearable electronic device can be worn on the user's head by the fix unit, it is possible to set the predetermined acquisition condition to be looking up in advance so as to fit the user's behavior, since the user usually looks at the sky while observing weather condition and makes the action of looking up. In Step S602, it is possible to detect the posture of the user's head.

In Step S603, when it is determined that the detection result meets the predetermined acquisition condition, weather information is acquired. For example, the wearable electronic device may include wired or wireless network connection devices. When the posture determination unit determines that the detection result meets the predetermined acquisition condition, the weather information can be acquired from a specific server (the access address of which has been stored in advance, for example) by the wired or wireless network connection devices, in Step S603. In Step S604, a weather image corresponding to the weather information can be generated. And in Step S605, the acquired weather information or the generated weather image can be displayed.

Moreover, according to one example, the display method 600 shown in FIG. 6 may also include determining whether the wearable electronic device is indoors or outdoors. As an example, the display method 600 may include detecting of the intensity of the environment light, and determining whether the wearable electronic device is indoors or outdoors based on the intensity of the environment light detected by a light sensor module. As another example, the display method 600 may include acquiring geo-location information, and determining whether the wearable electronic device is indoors or outdoors based on the geo-location information acquired by a geo-location information acquisition module. When the environment determination unit determines that the wearable electronic device is currently being indoors, the first weather image corresponding to the weather information may be generated in Step S604, and the weather information and/or the first weather image may be displayed in Step S605. On the other hand, when the environment determination unit determines that the wearable electronic device is currently being outdoors, the second weather image corresponding to the weather information may be generated in Step S604, and the weather information and/or the second weather image may be displayed in Step S605.

According to one example of the invention, the second weather image corresponding to the weather information generated in Step S604 when the wearable electronic device is determined to be outdoors may be a part of the first weather image corresponding to the weather information generated in Step S604 when the wearable electronic device is determined to be indoors.

Moreover, according to another example of the invention, the display method 600 may also include acquiring time information. In Step S603, when it is determined the detection result meets the predetermined acquisition condition, the weather information corresponding to the time information is acquired. According to one example of the invention, the wearable electronic device may include an input module. The user may input a specific time by the input module. For example, the user input module may include a touch screen. When the touch screen detects that the user is performing a sliding input on the screen, the time information according to the direction and distance of the sliding detected by the touch screen may be acquired with reference to the current time. For example, a moment indicated by the sliding input by the user along a first direction on the touch screen may be set as the moment before current moment, and a moment indicated by the sliding input by the user along a second direction different from the first direction on the touch screen may be set as the moment after current moment. Every unit sliding distance (for example, 1 cm) corresponds to one hour. When it is determined that the detection result meets the predetermined acquisition condition, while a user sliding along the second direction is detected on the touch screen and the sliding distance is 1 cm, the time information indicating the moment one hour after the current moment may be acquired. In Step S603, the weather information corresponding to the moment one hour after the current moment is acquired. In Step S604, the weather image corresponding to the weather information is generated. And in Step S605, the acquired weather information may be displayed. Then, while the user continuously sliding along the second direction is detected on the touch screen and the sliding distance is 2 cm, the second acquisition unit may acquire the time information indicating the moment two hours after the current moment. In Step S603, the weather information corresponding to the moment two hour after the current moment is acquired. In Step S604, the weather image corresponding to the weather information is generated. And in Step S605, the weather information acquired may be displayed. Thus, the user may view the continuous change of the weather by continuously sliding input on the touch screen.

Moreover, according to another example of the invention, the display method 600 may also include acquiring geo-location information. In Step S603, when it is determined that the detection result meets the predetermined acquisition condition, the weather information corresponding to the geo-location is acquired.

In the display method according to the embodiment of the invention, it is possible to maintain the position relationship with respect to the first part of the user body by the fix unit, and it is possible to acquire and display the weather information and/or the weather image by detecting the posture of the first part of the user body and by determining the posture of the first part of the user body meets the predetermined acquisition condition based the detection result, so as to simplify operations about how the user acquires weather information, which conveniences the user.

According to one example of the invention, the wearable electronic device, on which the display method 600 is applied, may be a head-mounted electronic device. The wearable electronic device can be maintained on the head of the user by the fix unit. As described above, it is possible to set the predetermined acquisition condition to be looking up so as to fit the user's behavior, since the user usually looks at the sky while observing weather condition and makes the action of looking up. In this case, in Step S601, it is possible to detect the posture of the user's head, and acquire a detection result. In Step S602, it is possible to determine whether the posture of the user's head is looking up or not based on the detection result. And when the posture of the user's head is being looking up, it is determined that the detection result meets the predetermined acquisition condition.

Ordinary skills in the art may realize that, units, module, and steps of various examples described by the embodiments disclosed by the specification can be realized by electronic hardware, computer software or a combination thereof. In order to illustrate that the hardware and the software may exchange with each other, components of the various examples are generally described according to functions in the specification. Depending on certain applications and design constraints of the technical solution, it is determined whether these functions are implemented in a hardware way or a software way. Those skills in the art may implement the described functions for each certain application by using different ways, but the implementation shall not be considered as being beyond the scope of the invention.

Those skills in the art shall understand that various modifications, combinations, partial combinations and alteration may be performed to the invention depending on the design and other factors, as far as they are within the scope of the attached claims and equivalents thereof.

The invention claimed is:

1. A wearable electronic device, including:
   a fix unit, by which the wearable electronic device can maintain a position relationship with respect to a first part of a user body;
   a detection unit, configured to detect a posture of the first part of the user body, and to acquire a detection result;
   a posture determination unit, configured to determine whether the detection result meets a predetermined acquisition condition;
   a first acquisition unit, configured to acquire weather information when the posture determination unit determines that the detection result meets a predetermined acquisition condition;
   a second acquisition unit configured to acquire time information, wherein the second acquisition unit includes a touch screen for detecting that a user is performing a sliding input, the second acquisition unit is configured to acquire the time information according to a direction and a distance of the sliding input detected by the touch screen with reference to current time, a moment indicated by the sliding input by the user along a first direction on the touch screen is as a moment before current moment, and a moment indicated by the sliding input by the user along a second direction different from the first direction on the touch screen is set as a moment after current moment, and one unit distance of the sliding input corresponds to one unit time;
   an image generation unit, configured to generate a weather image corresponding to the weather information; and
   a display unit, configured to display the weather information and/or the weather image.

2. The wearable electronic device of claim 1, further includes:
   an environment determination unit, configured to determine whether the wearable electronic device is being indoors or outdoors,
   when the environment determination unit determines that the wearable electronic device is currently being indoors, the image generation unit generates the first weather image corresponding to the weather information; the display unit displays the weather information and/or the first weather image;
   when the environment determination unit determines that the wearable electronic device is currently being outdoors, the image generation unit generates the second weather image corresponding to the weather information, and
   the display unit displays the weather information and/or the second weather image.

3. The wearable electronic device of claim 1, further includes:
   a third acquisition unit, configured to acquire geo-location information, when the posture determination unit determines that the detection result meets the predetermined acquisition condition, the first acquisition unit acquires the weather information corresponding to the geo-location information.

4. The wearable electronic device of claim 1, wherein
   the wearable electronic device is a head-mounted electronic device;
   the wearable electronic device can be maintained on the user's head by the fix unit;
   the detection unit detects the posture of user's head, and acquires the detection result;

the posture determination unit determines whether the posture of the user's head is looking up based on the detection result, and when the posture of the user's head is looking up, the detection result is determined to meet the predetermined acquisition condition.

5. The wearable electronic device of claim 4, in which the wearable electronic device is a glasses-like electronic device, the wearable electronic device further includes:
a frame component;
a lens component, connected to the frame component;
the fix unit includes:
a first supporting arm, including a first connection portion and a first holding portion, wherein the first connection portion is configured to connect the frame component and the first holding portion;
a second supporting arm, including a second connection portion and a second holding portion, wherein the second connection portion is configured to connect the frame component and the second holding portion,
wherein the frame component includes a third holding portion,
the first holding portion, the second holding portion, and the third holding portion are configured to maintain the wearable electronic device on the user's head.

6. A display method, applied to a wearable electronic device, the wearable electronic device includes a fix unit, by which the wearable electronic device can maintain a position relationship with respect to a first part of a user body, the method includes:
detecting a posture of the first part of the user body and acquiring a detection result;
determining whether the detection result meets a predetermined acquisition condition;
acquiring weather information when the posture determination unit determines that the detection result meets a predetermined acquisition condition;
acquiring time information;
generating a weather image corresponding to the weather information; and
displaying the weather information and/or the weather image,
wherein the wearable electronic device includes a touch screen for detecting that a user is performing a sliding input, and acquiring time information comprises acquiring the time information according to a direction and a distance of the sliding input detected by the touch screen with reference to current time, a moment indicated by the sliding input by the user along a first direction on the touch screen is as a moment before current moment, and a moment indicated by the sliding input by the user along a second direction different from the first direction on the touch screen is set as a moment after current moment, and one unit distance of the sliding input corresponds to one unit time, acquiring the weather information when it is determined that the detection result meets the predetermined acquisition condition includes when it is determined that the detection result meets the predetermined acquisition condition, acquiring the weather information corresponding to the time information.

7. The display method of claim 6, further includes:
determining whether the wearable electronic device is being indoors or outdoors,
generating the weather image corresponding to the weather information includes:
when it is determined that the wearable electronic device is currently being indoors, the first weather image corresponding to the weather information is generated,
when it is determined that the wearable electronic device is currently being outdoors, the second weather image corresponding to the weather information is generated, and
displaying the weather information and/or the weather image includes:
when the first weather image corresponding to the weather information is generated, the weather information and/or the first weather image is displayed; and
when the second weather image corresponding to the weather information is generated, the weather information and/or the second weather image is displayed.

8. The display method of claim 6, further includes:
acquiring geo-location information,
acquiring the weather information when the posture determination unit determines that the detection result meets the predetermined acquisition condition includes:
when it is determined that the detection result meets the predetermined acquisition condition, the first acquisition unit acquires the weather information corresponding to the geo-location information.

9. The display method of claim 6, wherein
the wearable electronic device is a head-mounted electronic device;
the wearable electronic device can be maintained on the user's head by the fix unit;
detecting a posture of the first part of the user body and acquiring a detection result includes:
detecting of the posture of user's head and acquiring the detection result;
determining whether the detection result meets a predetermined acquisition condition includes:
determining whether the posture of the user's head is looking up based on the detection result, and when the posture of the user's head is looking up, determining the detection result matches the predetermined acquisition condition.

* * * * *